(12) United States Patent
Mangone, Jr.

(10) Patent No.: US 9,939,086 B1
(45) Date of Patent: Apr. 10, 2018

(54) CABLE, WIRE, CONDUIT, PIPE OR TUBE AFFIXING CLIP

(71) Applicant: Peter G. Mangone, Jr., Golden, CO (US)

(72) Inventor: Peter G. Mangone, Jr., Golden, CO (US)

( * ) Notice: Subject to any disclaimer, the term of this patent is extended or adjusted under 35 U.S.C. 154(b) by 300 days.

(21) Appl. No.: 14/717,466

(22) Filed: May 20, 2015

(51) Int. Cl.
| | |
|---|---|
| *F16L 3/233* | (2006.01) |
| *B65D 63/00* | (2006.01) |
| *F16L 3/137* | (2006.01) |
| *F16B 11/00* | (2006.01) |

(52) U.S. Cl.
CPC .......... *F16L 3/2336* (2013.01); *F16B 11/006* (2013.01); *F16L 3/137* (2013.01)

(58) Field of Classification Search
CPC ....... F16B 11/006; F16L 3/2336; F16L 3/137; F16L 3/2334; F16L 3/2332; Y10T 24/1498; Y10T 24/141; B65D 63/1081
See application file for complete search history.

(56) References Cited

U.S. PATENT DOCUMENTS

| | | | | |
|---|---|---|---|---|
| 4,214,349 A * | 7/1980 | Munch | ............... | B65D 63/1081 24/16 PB |
| 4,389,754 A * | 6/1983 | Sohma | ................... | F16L 3/137 24/16 PB |
| 6,105,908 A * | 8/2000 | Kraus | .................... | F16L 3/137 24/16 PB |
| 6,149,109 A * | 11/2000 | Stankowski | .......... | F16L 3/2334 24/16 PB |
| 7,740,210 B2 * | 6/2010 | Pilon | .................. | B65D 63/1081 24/16 PB |
| 7,762,503 B2 * | 7/2010 | Franks | .................... | F16L 3/233 24/16 PB |
| 7,934,297 B2 * | 5/2011 | Williams | ........... | B65D 63/1072 24/16 PB |
| 9,121,528 B2 * | 9/2015 | Foreman | ............... | F16L 3/2334 |
| 2012/0152587 A1 * | 6/2012 | Lemire | .................... | H02G 3/14 174/66 |

OTHER PUBLICATIONS

"10x Cable Clips Adhesive Cord Management Organizer Wire Holder 0.85" Clamp Black", <http://www.ebay.com/itm/10x-Cable-Clips-Adhesive-Cord-Management-Organizer-Wire-Holder-0-85-Clamp-Black-/131454588973> , downloaded Oct. 14, 2015.
"10x Adjustable Adhesive Cable Straps Cord Management Tie Mount Clips 1.0" Black", <http://www.ebay.com/itm/10x-Adjustable-Adhesive-Cable-Straps-Cord-Management-Tie-Mount-Clips-1-0-Black-/131518225849?hash=item1e9f18ddb9>, downloaded Oct. 14, 2015.
"Newest 15 Self-Adhesive Convenient Cable Organiser Clip for Management Cord Wire", <http://www.ebay.com/itm/Newest-15-Self-Adhesive-Convenient-Cable-Organiser-Clip-for-Management-Cord-Wire-/361270439613?hash=item541d656ebd>, downloaded Oct. 14, 2015.

(Continued)

*Primary Examiner* — Robert Sandy
*Assistant Examiner* — Matthew J Sullivan
(74) *Attorney, Agent, or Firm* — Michael Best & Friedrich LLP

(57) ABSTRACT

A conduit clip having a laterally toothed strap that can be drawn through a pair of locking structures in a laterally shifting torqueing motion to conveniently, securely, and irreversibly lash one or more conduits in place at a desired location.

15 Claims, 5 Drawing Sheets

(56) References Cited

OTHER PUBLICATIONS

"Wholesale 100pcs DIY Self Adhesive Cable Wire Mounts Mounting Base Clamps Clip Wire Ties Zip Mount Base", <http://www.aliexpress.com/item/Wholesale-100pcs-DIY-Self-Adhesive-Cable-Wire-Mounts-Mounting-Base-Clamps-Clip-Wire-Ties-Zip-Mount/32473050433.html>, downloaded Oct. 14, 2015.

"MB Self Adhesive Cable Tie Mounts", <http://www.dtl-connectors.co.uk/store/cable-accessories/cables-ties-fixings/cable-tie-fixings/mb-self-adhesive-cable-tie-mounts.html>, downloaded Oct. 14, 2015.

* cited by examiner

CABLE, WIRE, CONDUIT, PIPE OR TUBE AFFIXING CLIP

FIELD

This invention pertains to readily molded and manufactured, one-piece clips for affixing one or more cables, wires, conduits, pipes, or tubes to a surface in a desired location.

BACKGROUND

One or more cables, wires, flexible conduits, pipes, and tubes of various sizes and shapes (referred to collectively below as "conduits") are often run in close proximity for television, internet, telephony, electrical power and other applications. When such conduits are not affixed in place, they can be unstable, subject to damage or tangling, difficult to identify, and unsightly. Various clips have been developed over the years to address these issues by locking single conduits or multiple conduits into bundles within the clips and affixing the clips to support surfaces.

Prior clips are typically designed to fix conduits in the clips before the clips are attached to support surfaces and may contain separate base and strap portions that must be separately molded and assembled and are unwieldy to handle. Prior clips also have a variety of drawbacks including expense, inability to accommodate multiple conduits of varying sizes and shapes into the clips, difficulty in reliably locking the clips about multiple conduits, and awkwardness in affixing the clips to support surfaces. It is also often difficult to maneuver the prior conduit-containing clips into place and to attach them to the support surfaces. Finally, prior clips often have strap designs that create stress points during use making them prone to early failure.

The present one-piece conduit clip embodiments meet these challenges with a structure that is economical to manufacture, includes a strap that preferably is uniformly thick and smooth along both its top and bottom surfaces to evenly distribute stresses in the strap when it is bent and thereby to prevent premature failure, and can be mounted to support surfaces prior to gathering and locking conduits into place in the clips. The present one-piece conduit clip embodiments are also easy to use in gathering and irreversibly locking about one or more conduits of various sizes and shapes.

SUMMARY

Embodiments comprise one piece, one-way locking clips for affixing one or more conduits to a surface. The clips have a base with an integral strap attached to the base at its proximal end. The strap may have a leader located at its distal end. This leader may have a series of laterally extending ribs or other form of surface irregularities disposed on its surface.

The strap has a locking section located along a proximal portion of the strap. This locking section includes pairs of outwardly directed strap teeth located along opposite lateral edges of the strap. The teeth include generally flat bases, ramps and apices where the ramps meet the flat bases. In a preferred embodiment the ramps of the teeth are radiused to reduce their cross-section along their tip area to facilitate flexure of the teeth as they pass through the distal and proximal locking structures of the clip. Although the laterally disposed teeth are aligned in the figures referenced below, they need not be laterally aligned.

The teeth on one side of the strap may be larger and deeper than the teeth on the other side of the strap to facilitate shifting and or torqueing of the strap as it is locked in place. Making the series of teeth on one side of the strap larger and deeper than the series of teeth on the other side of the strap teeth also facilitates shifting or torqueing action of the strap, as described below.

Distal and proximal locking structures extend from the top surface of the base. The locking structures have respective first and second pairs of laterally spaced pillars for engaging the pairs of outwardly directed strap teeth and a crossmember that extends between the pillars.

The base of the clip may have a bottom surface with an adhesive layer applied to the bottom surface. The base may also have notches in at least two of its edges for receiving surface penetrating fastening devices like nails or screws.

BRIEF DESCRIPTION OF THE DRAWINGS

In order to aid in understanding the invention, it will now be described in connection with exemplary embodiments with reference to the accompanying drawings in which like numbers are given to like features with reference to the accompanying drawings wherein.

DETAILED DESCRIPTION OF THE INVENTION

Figure 1:
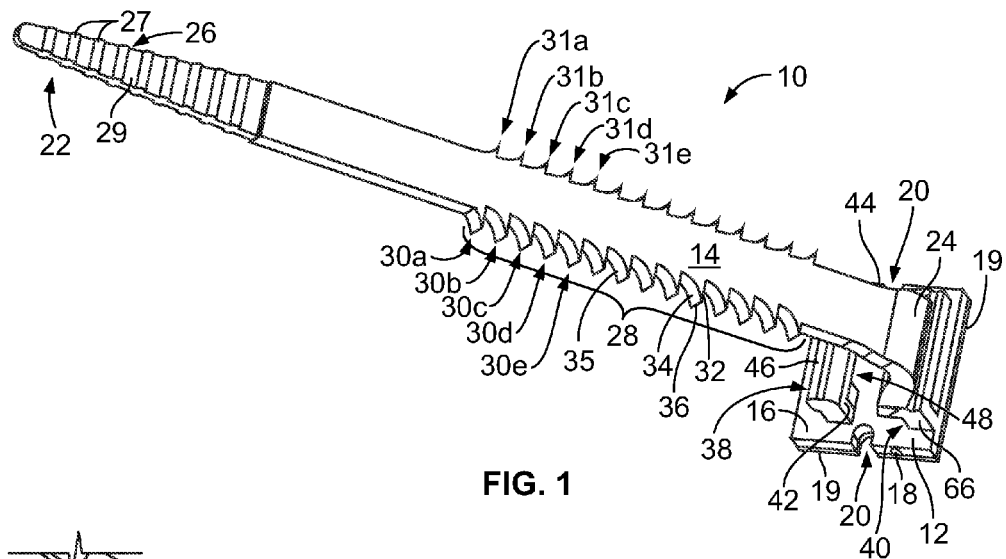
FIG. 1 is a perspective view of a conduit clip embodiment.
Figure 2A:
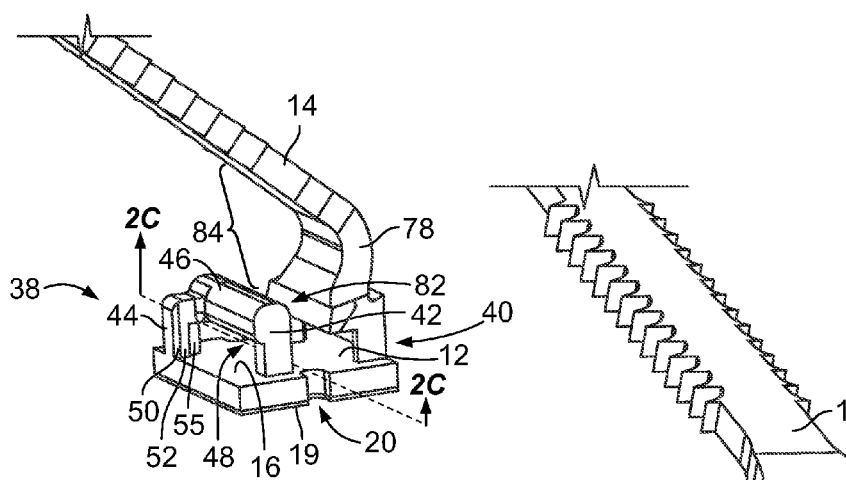
FIG. 2A is a partial perspective view of the clip embodiment of FIG. 1 highlighting the distal portion of the locking structure of the clip.
Figure 2B:
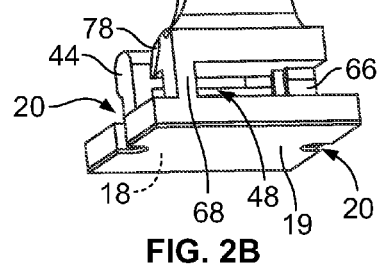
FIG. 2B is a partial perspective view of the clip embodiment of FIG. 1 highlighting the proximal portion of the locking structure of the clip.

Turning first to FIGS. 1, 2A and 2B, a one-piece molded locking clip 10 is shown. This locking clip embodiment may be molded from nylon, propylene or any other appropriate moldable, strong and flexible material. Clip 10 is designed for one-way or irreversible locking operation to lash down one or more conduits without permitting the clip to be opened once the conduits are locked into the clip.

Clip 10 includes a base 12 and an integral strap 14. The strap has a top preferably smooth surface 15 and a bottom preferably smooth surface 17. The smooth strap surfaces help improve the life of the strap by resisting stresses at the bases of the side teeth (described below) encountered on bending and manipulating the strap.

An adhesive layer 19 may be placed on bottom surface 18. When an adhesive layer is used, it preferably will have a release strip, also known as a paper or film liner (not shown)

that will be removed before the base is adhered to a desired location on a support surface. The base may also have notches 20 located along edges of the base. These notches will receive surface penetrating fastening devices like screws or nails that may be used in lieu of or in conjunction with the adhesive layer to attach the base to a desired location on a support surface.

Figure 8:
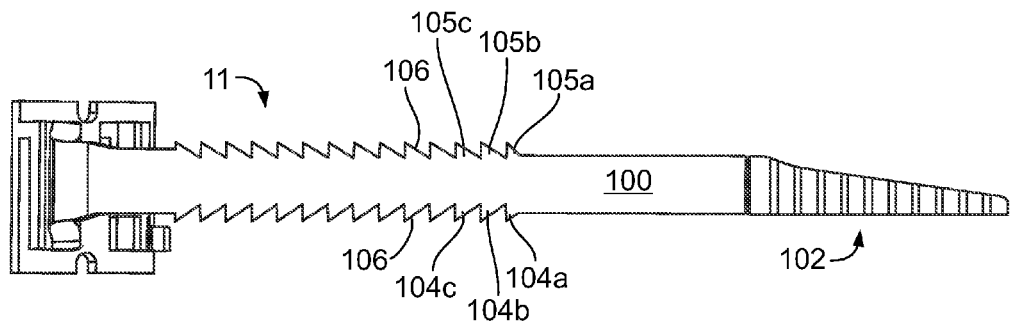
FIG. 8 is a perspective view of a second conduit clip embodiment.

Strap 14 has a distal end 22 and a proximal end 24 where it projects from the top of crossmember 78 (described below). A strap leader 26 is located at the distal end of the strap. The leader is used to manipulate the strap to gather and retain multiple conduits and to facilitate the insertion of the strap into the locking structures of the clip to lash down the conduits as will be described in detail below. The strap leader may have a series of laterally extending ribs 27 separated by reduced material portions 29 having a thickness less than the thickness of the rest of the strap to make gripping the leader more secure and convenient and to facilitate handling of the top or the bottom of the leader. The ribs may be on the top and bottom of the strap as shown or they may be on only on top, for example, as shown in FIG. 8. Also, while it is preferred that the leader be symmetrical laterally as shown, it may be asymmetrical if desired, for example as also shown in FIG. 8.

Strap 14 also includes a locking section 28 located between the strap leader and proximal end 24 of the strap. The strap locking section includes pairs of outwardly directed strap teeth 30*a*/31*a*, 30*b*/31*b*, 30*c*/31C, 30*d*/31*d*, 30*e*/31*e*, etc. along the opposite lateral edges of the strap. Preferably, the series of teeth on one side of the strap (30*a*, 30*b*, etc.) will be larger and deeper than the teeth on the other side of the strap so that the larger teeth may bear the brunt of any withdrawal force applied to the strap once conduits are lashed down in the clip. Making the teeth on one side of the strap larger and deeper than the teeth on the other side of the strap also helps facilitate shifting or torqueing of the strap locking section as it moves through locking structures 38 and 40, as discussed below. However, less preferably equally sized teeth may be used on both sides of the strap if desired.

Figure 3:
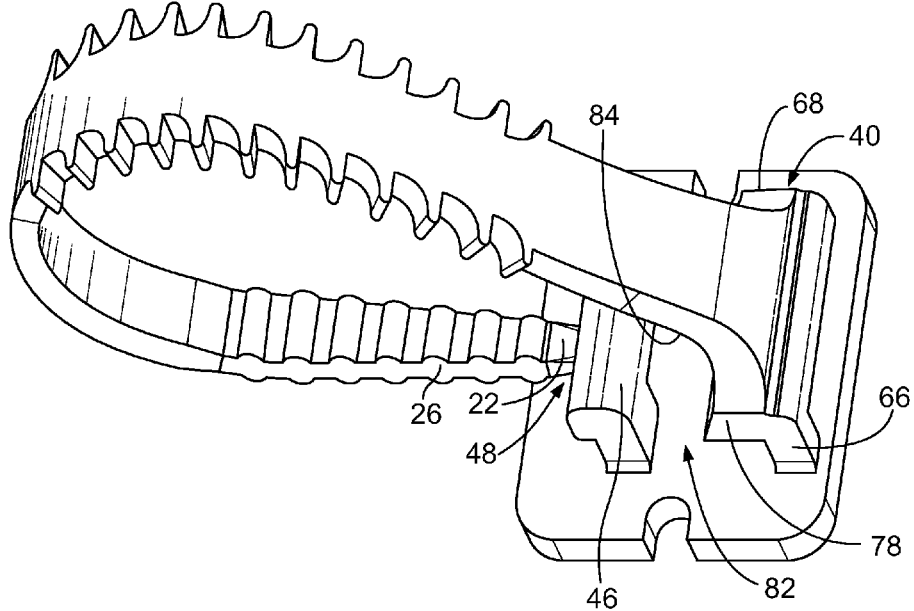
FIG. 3 is a perspective view of the distal and proximal locking structures of the clip of FIG. 1 with the clip strap in position as if encircling conduits and entering the distal locking structure of the clip.

The pairs of teeth include a generally flat base 32, a ramp 34 and an apex 36 where the ramp meets the flat base. Apices 36 may have a slight radius as shown, for example, in FIGS. 4-7, or may be more substantially radiused, as shown, for example, in FIG. 3.

Ramps 34 of the teeth are undercut or radiused as shown. This undercutting of ramps 34 narrows the teeth at tooth tips 35 thus increasing the flexibility of the tips by reducing the cross-section of the teeth at their tips to facilitate the locking process as the strap is lashed into the clip. As a result of the material from which the teeth are made and the undercutting of the teeth toward the tooth tips, the teeth are resilient and able to compress and decompress as the strap is drawn through clip locking structures 38 and 40 to help achieve a secure, irreversible locking action, as discussed below.

A distal locking structure 38 is molded onto and extends away from top surface 16 of base 12. This distal locking structure includes first and second laterally spaced upstanding first pillar 42 and second pillar 44 for engaging the strap teeth and a crossmember 46 that extends between the pillars. The pillars, crossmember and base top surface 16 together define a distal strap-receiving passage 48.

Figure 2C:
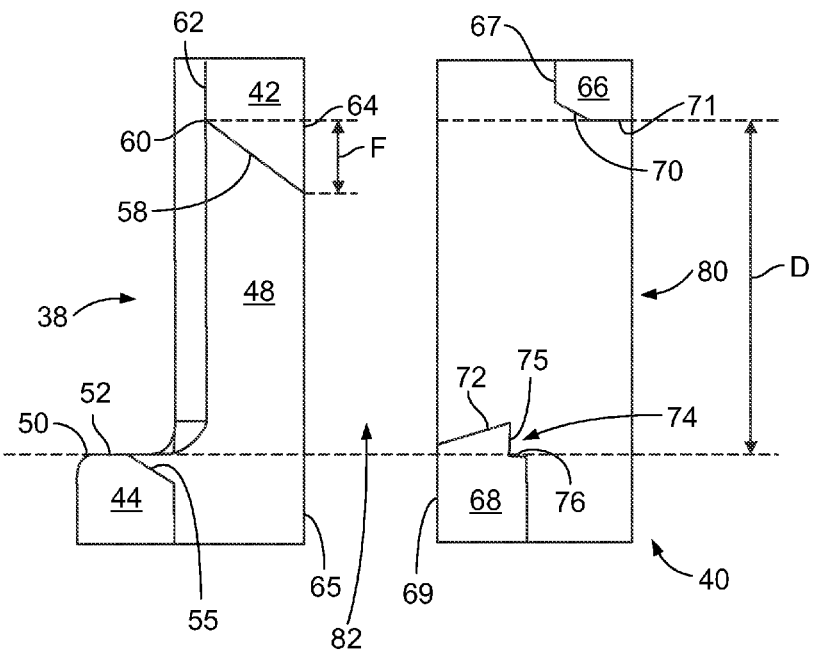
FIG. 2C is a partial top cutaway view of the clip embodiment of FIG. 1 taken along 2C-2C in FIG. 2B.

The distal inner corner 50 of second pillar 44 is preferably radiused as shown in FIG. 2A of the partial bottom view of FIG. 2C and pillar 44 has a generally flat inner surface 52 adjacent corner 50. A chamfered wall 55 extends from and angles away from flat inner surface 52 of pillar 44 to provide clearance for appropriate ones of the "31" series of teeth as the strap angularly shifts or is torqued as it is drawn through the distal and proximal locking structures.

As can best be seen in the view of FIG. 2C, the inside wall 58 of first pillar 42 of the distal locking structure 38 is angled into passage 48 from a corner 60 where wall 58 meets outer face 62 to help compress appropriate ones of the "30" series of teeth as the strap is drawn through the distal locking structure. When the "30" series teeth clear wall 58 they return to their uncompressed state so that they may rest against wall 64 to help prevent withdrawal of the strap from the clip. A lateral distance F is shown along the wall 64 of pillar 42 corresponding to the base of a right triangle in which angled wall 58 of pillar 42 serves as its hypotenuse. Preferably, distance F will be less than or equal to base 32 of teeth 30*a*, 30*b*, etc. Additionally, preferably distal face 62 of pillar 42 will be sufficiently wide to ensure that the tips 35 of teeth 30*a*, 30*b*, etc. engage corner 60 of pillar 42 as the strap is drawn into and past the position illustrated in FIG. 4.

Wall 58 is at an obtuse angle with respect to outer distal face 62 of pillar 42. Preferably, walls 55 and 58 will be generally parallel to each other to smoothly and efficiently shift the strap locking section laterally as it is pulled through the distal locking structure 38, as discussed below. Finally, pillar 42 has a flat proximal wall 64 that intersects beveled surface 58 of the pillar.

Proximal locking structure 40 includes upstanding pillars 66 and 68 which have respective flat, parallel distal surfaces 67 and 69. Pillar 66 has a beveled wall 70 that is angled into strap-receiving passage 80 of the proximal locking structure at an obtuse angle with respect to surface 69 to compress appropriate ones of the "30" series of teeth as the strap is drawn through the proximal locking structure. Pillar 68 has a beveled wall 72 angled into strap-receiving passage 80 at an obtuse angle with respect to surface 69 to help compress appropriate ones of the "31" series of teeth as the strap is drawn through the proximal locking structure. When the "31" series of teeth clear base 75 of L-shaped notch 74 they return to their uncompressed state so that they may rest against base 75 to help prevent withdrawal of the strap from the clip. Walls 70 and 72 are both angled inwardly towards strap-receiving passage 80 (described below) and preferably are at the same obtuse angle with respect to surfaces 67 and 69. Wall 70 and 72 help shift the strap locking section back from a laterally displaced position at the distal locking structure to a centered position in strap receiving passage 80 of the proximal locking structure.

As referenced above, pillar 68 includes a proximal notch 74 at the proximal end of wall 72 that may be L-shaped as shown. In the illustrated embodiment, notch 74 has a back wall 75 that is generally parallel to distal surface 69 and a base 76 that is generally perpendicular to distal surface 69. The height of wall 75 preferably will be slightly less than or equal to base 32 of teeth 31*a*, 31*b*, etc. to achieve maximum purchase of the teeth in the L-shaped notch. A crossmember 78 (FIG. 2B) extends between pillars 66 and 68 forming a proximal strap-receiving passage 80 of the proximal locking structure defined by pillars 66 and 68, crossmember 78 and base top surface 16.

Figure 5:
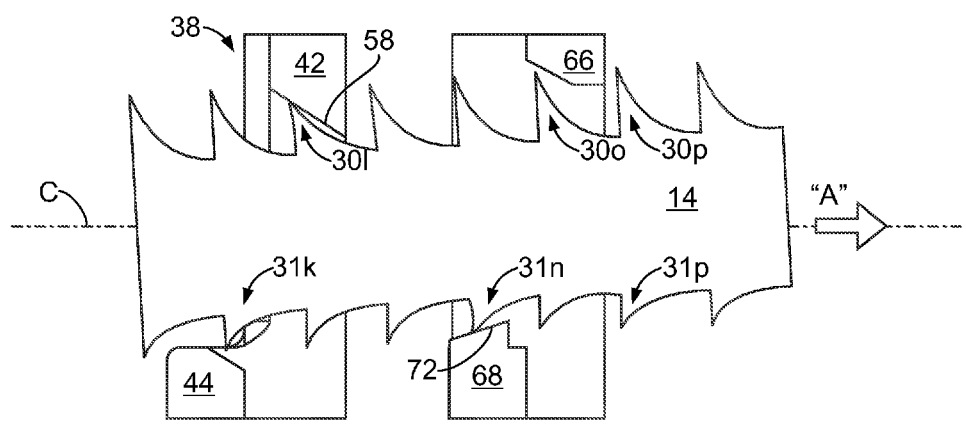
Figure 6:
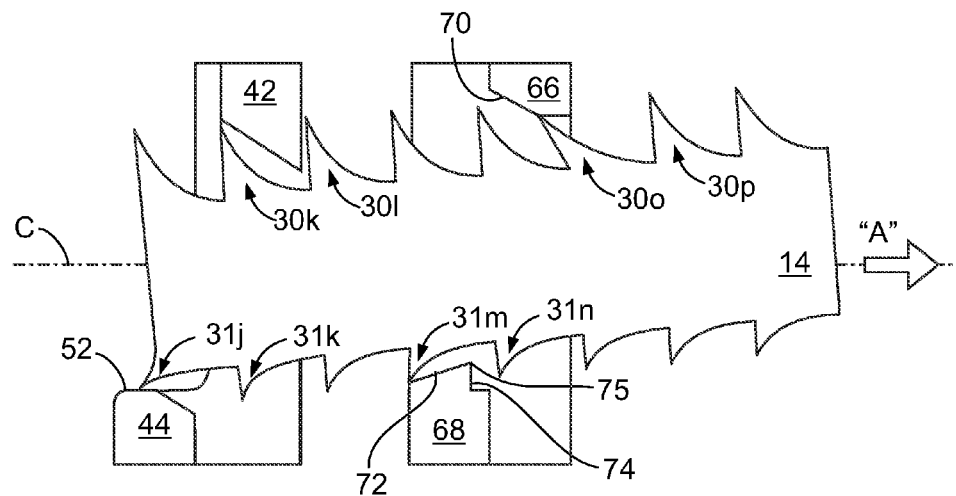

Diagonal pillar pair 42 and 68 initiate the lateral torqueing of the strap as the strap is drawn in direction "A" through clip distal and proximal locking structures 38 and 40. Thus, as best can be seen in FIG. 5, pillar pairs 42/68 respectively provide a pivot point at "30" series teeth along angled wall 58 of pillar 42 while shifting the strap about this pivot point by action of diametrically opposite series "31" teeth as they ride along wall 72. In the meanwhile, pillar pairs 44 and 66 facilitate this shifting action by providing clearance for diametrically opposite series "30" and "31" teeth at chamfered wall 55 of pillar 44 and inner wall 71 of pillar 66. As a result of this, the strap is angled across axis "C" at the instant depicted in FIG. 5. In FIG. 6, the pivot action is handed off to adjacent pillar pairs 44 and 68. Thus, a distal series "31" tooth now provides a pivot point along inner surface 52 of pillar 44 while further shifting the strap about this pivot point by action of a proximal series "31" tooth riding along beveled wall 72 of pillar 68. As a result of this, the strap is further angled across axis "C" at the instant depicted in FIG. 6. Finally, after the strap reaches the next locked configuration depicted in FIG. 7, it is returned to alignment with axis "C", resisting further torqueing or withdrawal in direction "B" since flat face 32 of tooth 30l now abuts wall 64 of pillar 42, flat face 32 of tooth 31n now abuts base 75 of L-shaped notch 74 and apex 36 of tooth 30o abuts inner wall 71 of pillar 66.

When one or more conduits are to be affixed to a support surface, preferably clip 10 will be positioned at an appropriate location on a support surface (not shown) and then attached with adhesive and or nails/screws at base notches 20, as desired. Then the user will grasp the conduit(s) and move them into position generally opposite gap 82 between crossmembers 46 and 78 and adjacent proximal portion 84 of the bottom surface 17 of strap 14.

Next, the user will bend the strap over the conduit(s) until strap distal end 22 is opposite distal strap-receiving passage 48 (FIG. 3), passing the strap distal end through passage 48, across gap 82 and through strap receiving passage 80 until strap leader 26 extends beyond crossmember 78 between pillars 66 and 68. Finally, the user will grasp a portion of the strap leader accessible beyond proximal locking structure 40 and pull until the strap is locked tightly in place to lash the conduit(s) in gap 82 between crossmembers 46 and 78 and adjacent to proximal portion 84 of the bottom surface of strap 14.

The unique locking action of the embodiment of clip 10 may be understood from FIGS. 4, 5, 6 and 7 which depict the engagement of the bilateral teeth with pillars 42, 44, 66 and 68. These figures show a mid-portion of strap 14 (running from arbitrarily chosen bilateral tooth pairs 30j/31j through 30q/31q) advancing through distal and proximal locking structures 38 and 40. The lateral distance D (FIG. 2C) between inner surface 52 of pillar 44 and the inner wall 71 of pillar 66 should be less than the lateral distance E (FIG. 4) between the apices 36 of the bilateral teeth of the strap.

Figure 4:
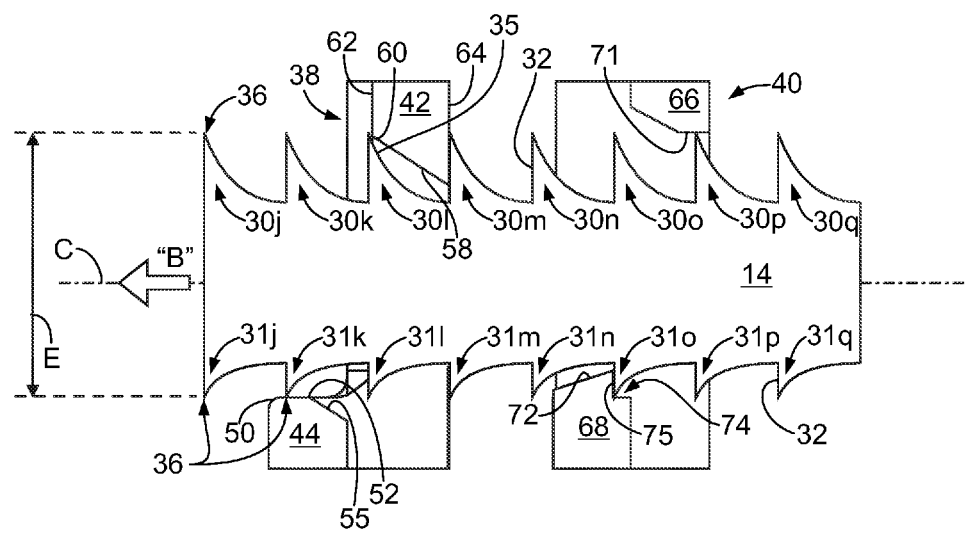
FIGS. 4-7 are partial views of a portion of the clip strap advancing through the distal and proximal locking structures of the clip.

Turning first to FIG. 4, it can be seen that base 32 of strap tooth 30l is at rest opposite base 75 of notch 74 and in alignment with axis C which runs through strap-receiving passages 48 and 80 as the strap is about to be pulled through the distal and proximal locking structures in direction "A". This is the first locking position illustrated in FIGS. 4-7. At this instant the apex 36 of tooth 31k is riding along inner surface 52 of pillar 44, tooth 30l is about to engage inner corner 60 of pillar 42 and the apex of tooth 30p is riding along inner surface 71 of pillar 66. Removal of or loosening the strap by pulling in direction "B" opposite to direction "A" is prevented by tooth 30l abutting base 75, and diametrically opposite tooth 30m abutting flat proximal wall 64 of pillar 42. In addition, in this position, lateral movement as well as slippage of the strap in direction "B" is inhibited by the contact of teeth 30p and 31k, respectively, with inner wall 71 of pillar 66 and inner surface 52 of pillar 44.

At the next instant of movement in direction "A" (depicted in FIG. 5) strap 14 will have advanced in direction "A" through the locking structures such that teeth 30l and 30m lift away from their respective positions. Tooth 31n will be compressed as shown after riding up along angled wall 72 while diametrically opposed tooth 30l will be compressed as shown after riding up along wall 58 of pillar 42 leaving a second pair of diametrically opposed teeth 31k and 30o spaced from and approaching pillars 44 and 66. In the course of this movement, diametrically opposed teeth 30l and 31n cause the strap locking section to shift laterally and away from pillar 68 and toward pillar 66 to a position that is now angled with respect to axis C.

At the next instant, as depicted in FIG. 6, it can be seen that as the strap continues moving in direction "A" the shifting action has continued as tooth 30o is compressed it moves up across beveled wall 70 of pillar 66, while tooth 31j rides along and is compressed against inner surface 52 of pillar 44, and tooth 31m begins riding up a long beveled wall 72 of pillar 68.

Figure 7:
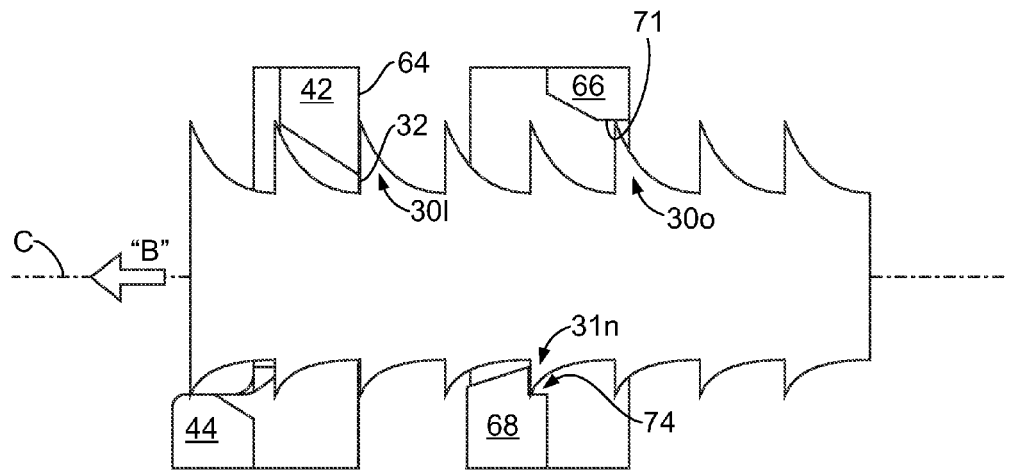

Finally, in FIG. 7 the strap reaches a secure locked position that resists any force applied in direction "B" attempting to withdraw the strap from the locking structures of the clip. In this locked position base 32 of tooth 31n is moved into position resting against back wall 75 of notch 74 of pillar 68 and base 32 of now decompressed tooth 30l is resting against flat proximal wall 64 of pillar 42. As can be seen in this figure, the strap has shifted back to a fully aligned orientation in the strap-receiving passages of the proximal and distal locking structures in alignment with axis C as in FIG. 4.

FIG. 8 illustrates an alternative strap design 100 which may be used in otherwise similarly structured clip 11. While this design has an optional asymmetrical leader 102, most importantly its bilateral teeth 104a/105a, 104b/105b, etc. have flat ramps 106. In the absence of radiused tooth ramps as in the previously discussed embodiment, the teeth of clip 11 preferably will be molded out of a more malleable material to enable the teeth to flex and the strap to shift and lock generally as described above.

Figure 9A:
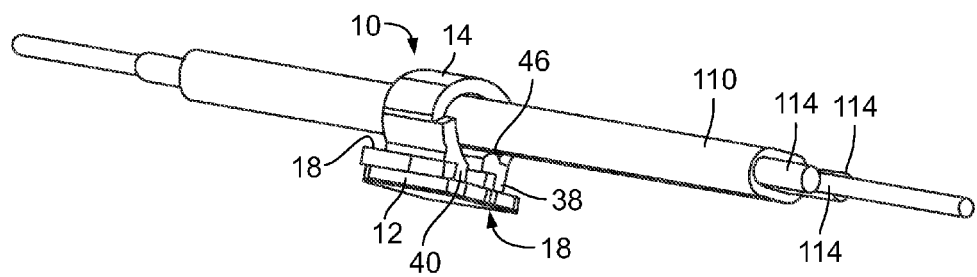
FIG. 9A is a perspective view of an oblong optical fiber cable mounted in a clip embodiment.
Figure 9B:
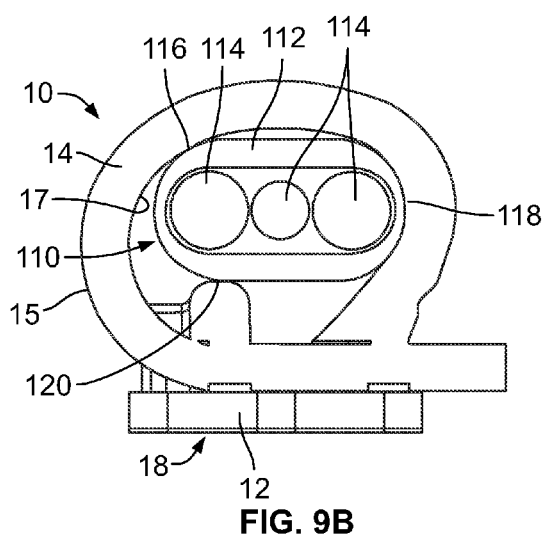
FIG. 9B is a front cross-section view of the clip mounted optical fiber cable shown in FIG. 9B.

FIGS. 9A and 9B illustrate an optical fiber cable 110 having an oblong cross-section locked in place within a cable clip embodiment 10. Optical fiber cable 110 includes an outer sheath 112 enclosing optical fibers 114. As can be seen in these figures, strap 14 has been drawn tightly around the optical fiber cable so that the strap bottom surface 17 abuts the outer surface of sheath 112 at areas 116 and 118 while the sheath rests against the top surface of crossmember 46 at 120 locking the cable in place in the clip. Although not shown in this figure, the clip typically will be affixed to a supporting surface before the optical fiber cable is locked in the clip.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the embodiments of the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. It should be understood that the illustrated embodiments are exemplary only, and should not be taken as limiting the scope of the invention.

| Table of Reference Characters | |
|---|---|
| Reference No. | Description |
| 10, 11 | locking clip embodiments |
| 12 | base |
| 14 | strap |
| 15 | strap top surface |
| 16 | base top surface |
| 17 | strap bottom surface |
| 18 | base bottom surface |
| 19 | adhesive on bottom base surface |
| 20 | base notches |
| 22 | strap distal end |
| 24 | strap proximal end |
| 26 | strap leader |
| 27 | Strap ribs |
| 28 | strap locking section |
| 29 | reduced material portions between leader ribs |
| 30a/31a, 30b/31b, 30c/31c, 30d/31d, 30e/31e, etc. | strap teeth pairs |
| 32 | generally flat tooth base |
| 34 | radiused tooth ramp |
| 35 | tip of tooth |
| 36 | apex of tooth |
| 38 | distal locking structure |
| 40 | proximal locking structure |
| 42, 44 | pillars of proximal locking structure |
| 46 | crossmember of proximal locking structure |
| 48 | distal strap-receiving passage of distal locking structure |
| 50 | radiused distal inner corner of pillar 44 |
| 52 | flat inner surface of pillar 44 |
| 55 | chamfered wall of pillar 44 |
| 56 | forward edge of pillar 44 of proximal locking structure |
| 58 | angled wall of pillar 42 of distal locking structure |
| 60 | inner corner of pillar 42 of proximal locking structure |
| 62 | distal outer face of pillar 42 |
| 64 | flat proximal wall of pillar 42 |
| 66, 68 | pillars of proximal locking structure |
| 67, 69 | distal surfaces of pillars 66, 68 |
| 70 | beveled wall of pillar 66 |
| 71 | inner wall of pillar 66 |
| 72 | beveled wall of pillar 68 |
| 74 | L-shaped notch |
| 75 | base of L-shaped notch 74 |
| 76 | second leg or base of notch in pillars 68 |
| 78 | crossmember extending between pillars 66 and 68 |
| 80 | strap-receiving passage of proximal locking structure |
| 82 | gap between crossmembers |
| 84 | proximal portion of bottom surface of strap |
| 100 | alternate strap design |
| 102 | asymmetrical strap leader |
| 104a/105a, 104b/105b, etc. | alternate teeth design |
| 106 | teeth ramp |
| 110 | optical fiber cable |
| 112 | outer sheath of optical fiber cable |
| 114 | optical fibers |
| 116, 118 | regions in which strap bottom surface abuts outer surface of cable sheath |
| 120 | region where she rests against top surface of crossmember |
| "A" | direction of locking strap |
| "B" | direction of application of force to withdraw strap from locking structures of clip |
| "C" | longitudinal axis passing through clip distal and proximal locking structures |

What I claim is:

1. A one piece, one-way locking clip for affixing one or more conduits to a surface comprising:
    a base having a top surface and an integral strap attached to the base at its proximal end;
    the strap having a locking section located along a proximal portion of the strap;
    the locking section including outwardly directed strap teeth located along opposite lateral edges of the strap; and
    distal and proximal locking structures extending from the top surface of the base, the locking structures having respective first and second pairs of laterally spaced pillars for engaging the outwardly directed strap teeth and a crossmember that extends between the pillars,
    in which the base top surface and the pillars and crossmembers of the distal and proximal locking structures define distal and proximal strap-receiving passages between the base top surface and the crossmembers.

2. The locking clip of claim 1 in which the base has edges and notches are located along at least two edges for receiving surface penetrating fastening devices.

3. The locking clip of claim 1 in which the strap has a leader located at its distal end.

4. The locking clip of claim 3 in which the strap leader has a series of laterally extending ribs disposed on a surface.

5. The locking clip of claim 1 in which the teeth on one side of the strap are larger and deeper than the teeth on the other side of the strap.

6. The locking clip of claim 1 in which the teeth include a generally flat base, a ramp and an apex where the ramp meets the flat base.

7. The locking clip of claim 6 in which the the ramps of the teeth are radiused to reduce the cross-section of the teeth at their tips.

8. The locking clip of claim 1 in which the base has a bottom surface and an adhesive layer applied to the bottom surface.

9. The locking clip of claim 1 in which one of the two pillars of the distal locking structure is positioned distally from the other pillar and has a distal inner radiused corner.

10. The locking clip of claim 1 in which one of the two pillars of the distal locking structure is positioned distally from the other pillar and has a chamfered wall that extends from and angles away from the inner surface of the distally positioned pillar.

11. The locking clip of claim 10 in which the other of the two pillars of the distal locking structure has an inside wall that is angled into the distal strap-receiving passage.

12. The locking clip of claim 11 in which the chamfered wall and the angled wall are generally parallel to each other.

13. The locking clip of claim 1 in which the pillars of the proximal locking structure have respective chamfered and angled walls that are angled into the proximal strap-receiving passage.

14. The locking clip of claim 13 in which the pillars have respective flat, parallel distal surfaces and the chamfered and angled walls are at an obtuse angle with respect to the flat parallel distal surfaces.

15. The locking clip of claim 13 in which one of the pillars includes a proximal notch for receiving a strap tooth.

\* \* \* \* \*